United States Patent [19]
Kester

[11] Patent Number: 5,904,107
[45] Date of Patent: *May 18, 1999

[54] APPARATUS FOR REDUCING THE EFFECTS OF WEAR WITHIN SEED PLANTER GAUGE WHEEL HUB ASSEMBLIES

[76] Inventor: Philip C. Kester, 2822 Jean St., East Moline, Ill. 61244

[*] Notice: This patent issued on a continued prosecution application filed under 37 CFR 1.53(d), and is subject to the twenty year patent term provisions of 35 U.S.C. 154(a)(2).

[21] Appl. No.: 08/496,694

[22] Filed: Jun. 29, 1995

Related U.S. Application Data

[63] Continuation-in-part of application No. 08/176,807, Jan. 3, 1994, abandoned.

[51] Int. Cl.⁶ .................................................. A01B 21/08
[52] U.S. Cl. ........................ 111/135; 111/52; 172/536
[58] Field of Search ........................ 111/52, 81, 135, 111/136, 137, 167, 189, 194, 200, 927; 172/15, 21, 41, 166, 311, 519, 538; 403/3, 4, 111

[56] References Cited

U.S. PATENT DOCUMENTS

| | | | |
|---|---|---|---|
| 2,977,777 | 4/1961 | Bernitz | 403/4 X |
| 3,575,360 | 4/1971 | Lawson | 242/150 |
| 3,664,434 | 5/1972 | Connor et al. | 111/135 X |
| 3,927,613 | 12/1975 | Nantz | 101/110 |
| 4,399,898 | 8/1983 | Olschewski et al. | 192/98 |
| 4,408,551 | 10/1983 | Keller et al. | 172/166 X |
| 4,522,085 | 6/1985 | Kane | 403/4 X |
| 4,760,806 | 8/1988 | Bigbee et al. | 111/135 X |
| 4,796,550 | 1/1989 | Van Natta et al. | 111/135 |
| 5,269,380 | 12/1993 | Lofquist et al. | 111/135 X |

*Primary Examiner*—Terry Lee Melius
*Assistant Examiner*—Robert Pezzuto
*Attorney, Agent, or Firm*—Henderson & Sturm

[57] ABSTRACT

An improved planter gauge wheel arm hub assembly which reduces the effects of wear on gauge wheel hubs and shafts and the resulting looseness between the gauge wheels and furrow disks. A preferred embodiment of the invention utilizes a threaded attaching stud and a threaded adjustment stud to carry a disc spring which applies a continuous force on the wheel arm hub.

16 Claims, 7 Drawing Sheets

APPARATUS FOR REDUCING THE EFFECTS OF WEAR WITHIN SEED PLANTER GAUGE WHEEL HUB ASSEMBLIES

CROSS-REFERENCE TO RELATED APPLICATIONS

This is a continuation-in-part of patent application Ser. No. 08/176,807, filed Jan. 3, 1990, now abandoned.

TECHNICAL FIELD

This invention relates to seed planting implements, and more specifically to an improved apparatus for attaching gauge wheel arms to the seed planter frame.

BACKGROUND ART

Most seed planters as currently manufactured utilize a pair of rotatively mounted disks that substantially contact each other where the disks enter the ground and diverge rearwardly and upwardly as they exit the ground, thereby forming a V-shaped furrow in the ground into which seed is deposited. These disks are supported on a frame which is connected to a tool bar by means of a parallel linkage which allows vertical motion of the frame as the planter is drawn across a field. The planter frame is supported by means of a pair of gauge wheels which are pivotally mounted to the frame, but which are incrementally limited in their movement relative to the furrow disks, so as to control the depth of penetration of the disks into the earth. The axis of each gauge wheel is positioned immediately aft of the axis of each furrow disk unit with the gauge wheel tires riding adjacent and pressing against the furrow disks. In this manner the gauge wheels also function to clean moist, sticky soil from the disks. After a period of time, the bore of the gauge wheel arm hub and the gauge wheel arm pivot shaft become worn, allowing the gauge wheel tire to shift away from the furrow disks, rendering the gauge wheels incapable of cleaning the disks and allowing mud and other debris from building up within the gauge wheel assembly.

A later version of the prior art design incorporates the use of a bushing over the gauge wheel arm shaft and a larger bore in the gauge wheel arm hub. This improves durability by providing a larger bearing area. It also prevents wear to the pivot shaft which is an integral part of the planter frame. Although an improvement, the addition of the bushing has not overcome the basic problem of radial looseness due to wear between the pivot parts.

DISCLOSURE OF THE INVENTION

The present invention discloses an improved planter gauge wheel arm hub assembly which reduces the effects of wear on gauge wheel hubs and shafts and the resulting looseness between the gauge wheels and furrow disks. A preferred embodiment of the invention utilizes a threaded attaching stud and a threaded adjustment stud to carry a disc spring which applies a continuous force on the wheel arm hub.

BEST MODE FOR CARRYING OUT THE INVENTION

Figure 1:
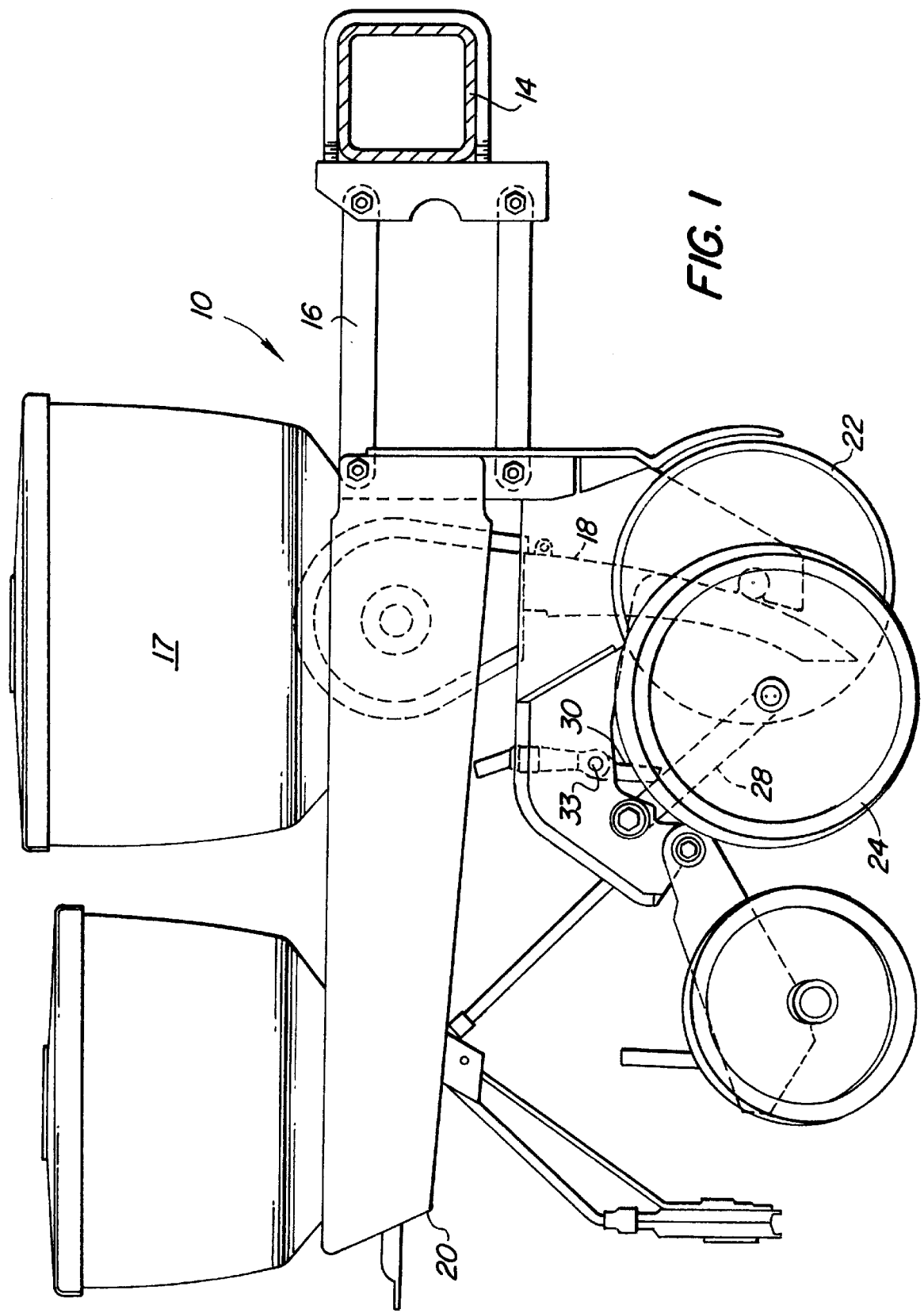
FIG. 1. is a side elevation view of a seed planter.

Referring now to the drawings, wherein like reference numerals designate identical or corresponding parts throughout the several views, FIG. 1 depicts a planter 10 which has a frame 20 which is pivotally attached to a tool bar 14 by means of a parallel linkage assembly 16 which provides for freedom of vertical movement of the planter as it traverses uneven ground. Seed is dispensed from a seed hopper 17 through a seed tube 18 into a furrow which is formed by furrow disks 22 which are rotatively mounted on frame 20 and which substantially contact each other where the disks 22 enter the ground and diverge rearwardly and upwardly as they exit the ground.

Figure 2:
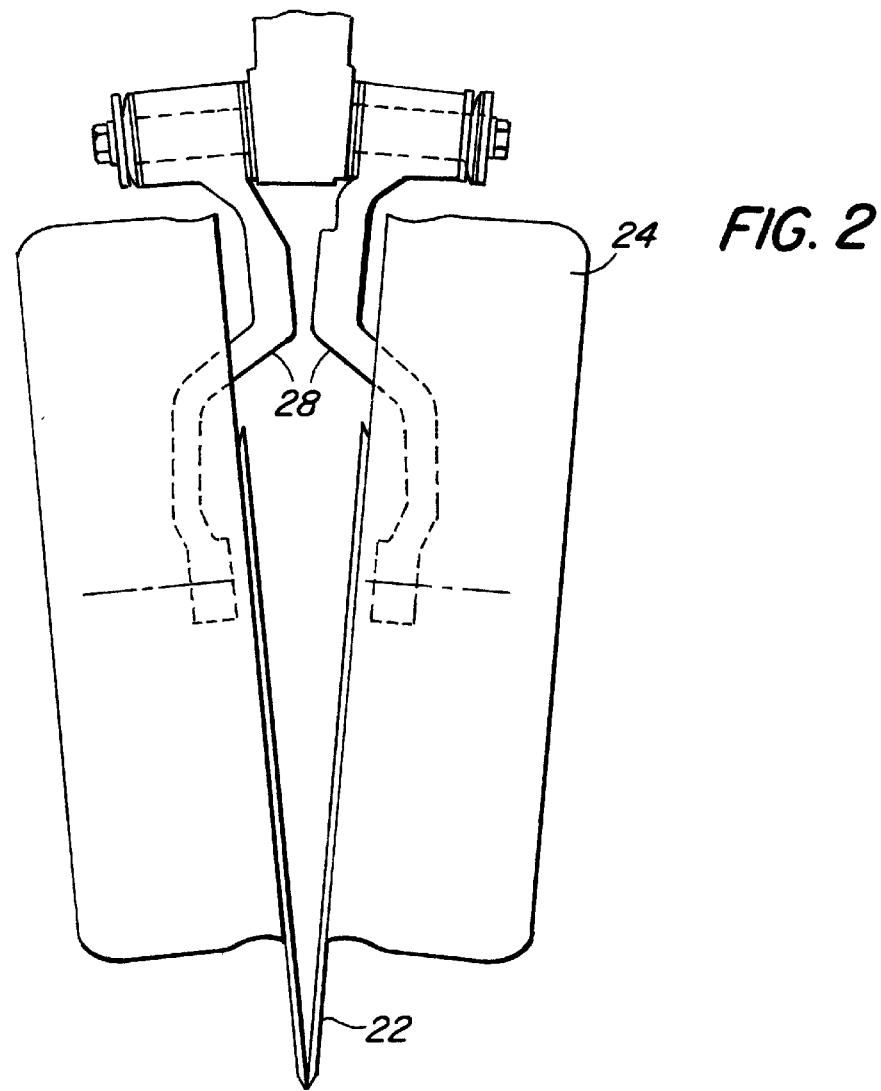
FIG. 2. is an enlarged fragmentary top plan view showing the furrow opener disks, gauge wheels, gauge wheel arms and means of attachment to the planter frame.

A pair of rotating gauge wheels 24 are pivotally mounted to frame 20 by means of gauge wheel arms 28. Best seen in FIG. 2, gauge wheels 24 are canted inward so as to maintain contact with the furrow disks 22 while the furrow disks 22 and the gauge wheels 24 rotate as the planter 10 moves across the ground. This contact stabilizes the soil as the furrow disks 22 are withdrawn from the earth and also cleans mud and debris from the furrow disks 22. The vertical position of the gauge wheels 24 is controlled by means of a depth adjustment stop 30 which is pivotally attached to frame 20 by a pin 33. It may therefore be understood that the planter frame 20 is supported above the ground by gauge wheels 24. As the vertical position of the gauge wheels 24 is changed relative to the frame 20, so too is the depth of penetration into the earth of the furrow disks 22.

The primary purpose of the present invention is to eliminate the effects of wear on the gauge wheel arm hub assembly. Therefore, it is important to study these effects in more detail. As mentioned above, a main function of the gauge wheel is to clean moist, sticky soil from the furrow disks. As wear occurs within the gauge wheel arm hub and on the pivot shaft, the gauge wheel tends to pull away from the furrow disks. Eventually, the gauge wheel will no longer clean the furrow disks properly. This can lead to plugging problems with dirt inside the gauge wheel. The furrow disks can also become corroded, thereby aggravating the problem of moist, sticky dirt building up on the disk. Eventually the furrow disks can become ineffective in cutting a clean furrow.

Another problem occasionally occurs in no-till conditions when the gauge wheel does not contact the furrow disks properly. Small grain stubble, instead of being flattened to the ground by the gauge wheel, can enter the gap between the gauge wheel and the furrow disks. Some of this stubble can be pulled from the ground and deposited in the void area between the opener disks and the inside of the gauge wheel, eventually preventing the furrow disks and/or the gauge wheel from turning.

Figure 3:
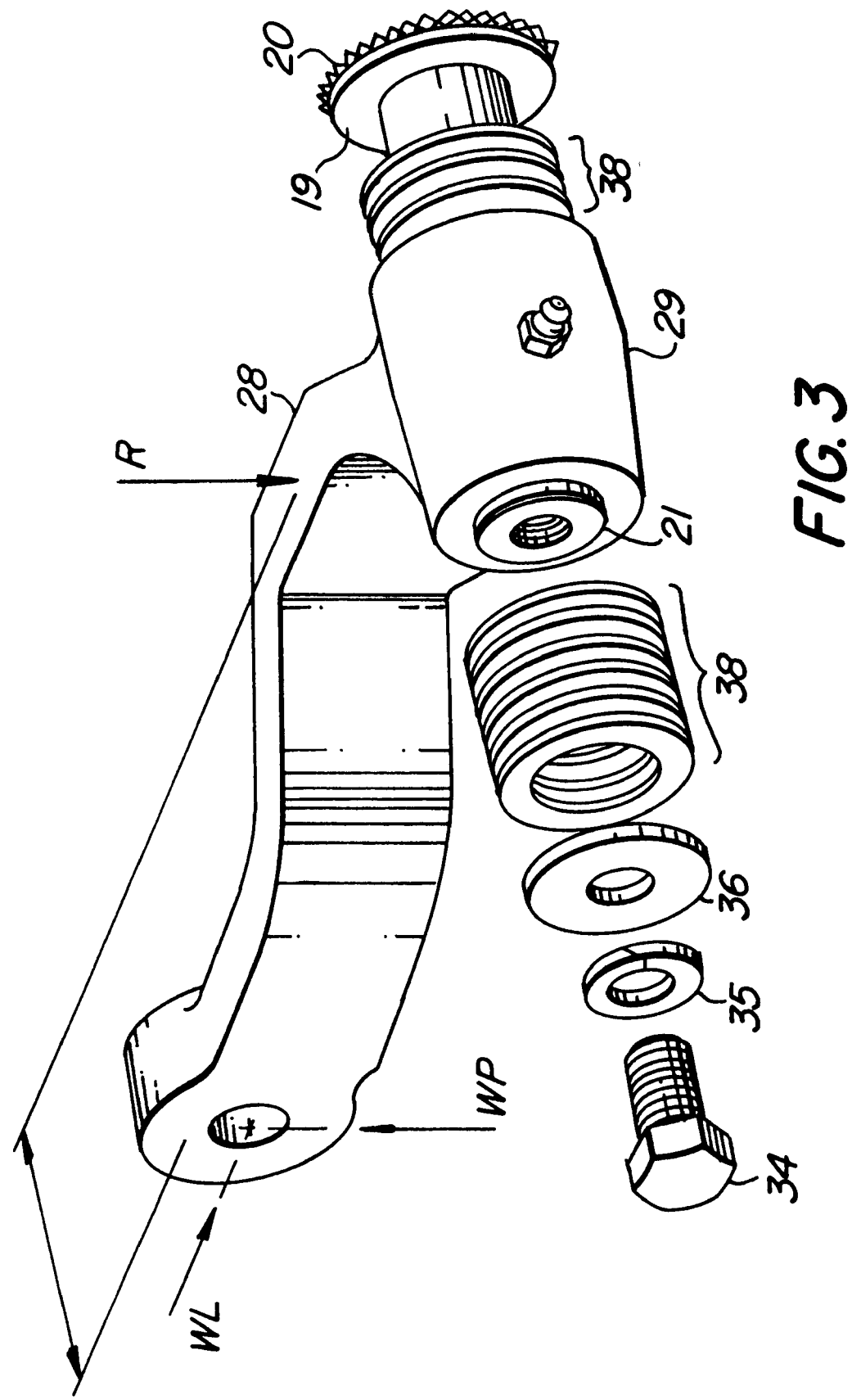
FIG. 3 is an exploded view of the prior art gauge wheel hub assembly.

FIG. 3 depicts a prior art means of attaching a gauge wheel arm 28 to a planter frame 20. Adjusting washers 38 are used between the arm 28 and the planter frame 20 to correctly position the arm 28 in a lateral direction. A retaining washer 36 is bolted rigidly to the pivot shaft 21 by bolt 34 and lock washer 35. A variable number of adjusting washers 38 are used between the end of the arm hub 29 and the retaining washer 36 to minimize lateral movement of the hub 29 on the pivot shaft 21. The hub 29 remains free to rotate on the pivot shaft 21.

The external forces on the gauge wheel arm 28 from the adjustable stop 30 and the ground are shown on FIG. 3. The ground force is shown in two components: WL the longitudinal component and WP the perpendicular component. The force from the adjustable stop 30 is shown as R. Because forces WP and R do not align with the center of the arm hub 29, it can be seen that the arm will try to turn about a longitudinal axis. This turning moment is resisted by a radial force from the pivot shaft 21 at each end of the hub 29.

It can also be seen in FIG. 3 that the longitudinal force WL is offset from the center of the hub 29. This results in a moment that causes the end of the arm 28 opposite the hub 29 to try to move outward. This moment also is resisted by a radial force from the pivot shaft 21 at each end of the hub 29. These radial forces at the end of the hub 29 cause wear on the surface of the hub bore and the pivot shaft 21, allowing the arm 28 to move farther away from its correct position. Because the length of the gauge wheel arm 28 and the diameter of the gauge wheel are several times as great as the length of the hub 29, the effect of this wear is amplified.

Figure 4:
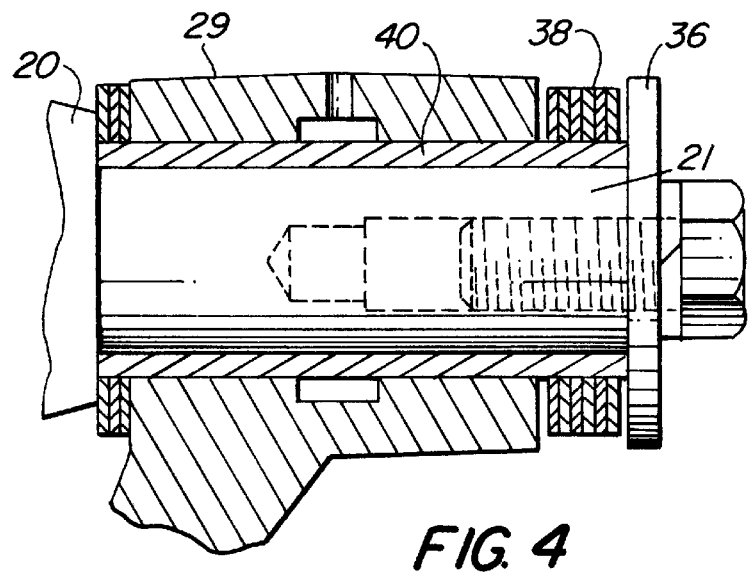
FIG. 4 is a cross-sectional view of the prior art attachment with a bushing added.

FIG. 4 shows an improved version of the prior art. A bushing 40, which is slightly longer than the pivot shaft 21, is clamped rigidly onto the pivot shaft 21 between the retainer washer 36 and the frame 20. The bore of the hub 29 and the inside diameter of the adjusting washers 38 are correspondingly larger to allow them to slide onto the bushing 40. The addition of this bushing 40 reduces wear by increasing the area of contact within the hub bore. It also prevents wear on the pivot shaft 21 which is an integral part of the planter frame 20.

Figure 5:
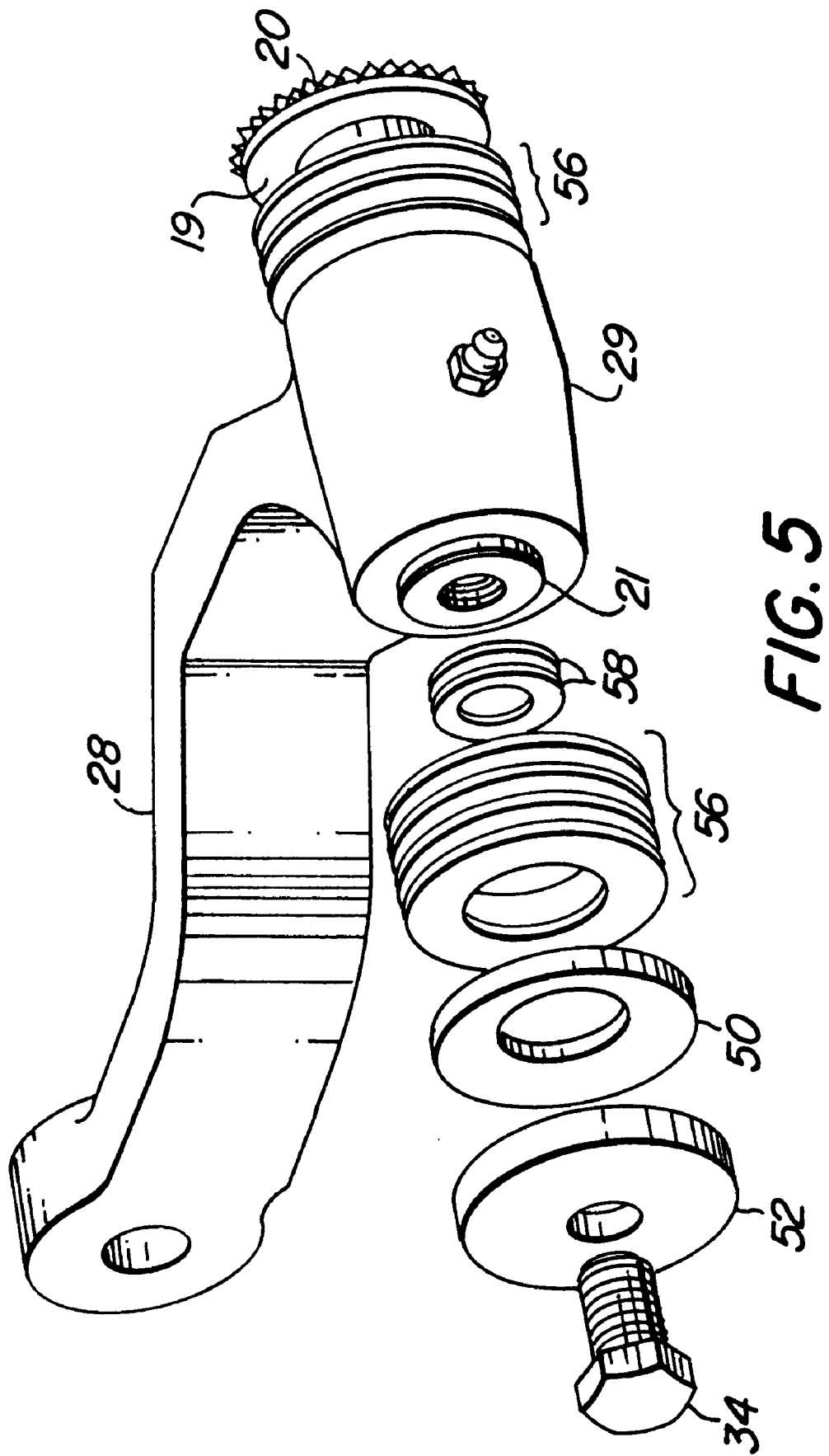
FIG. 5 is an exploded view of a first embodiment of the present invention.
Figure 6:
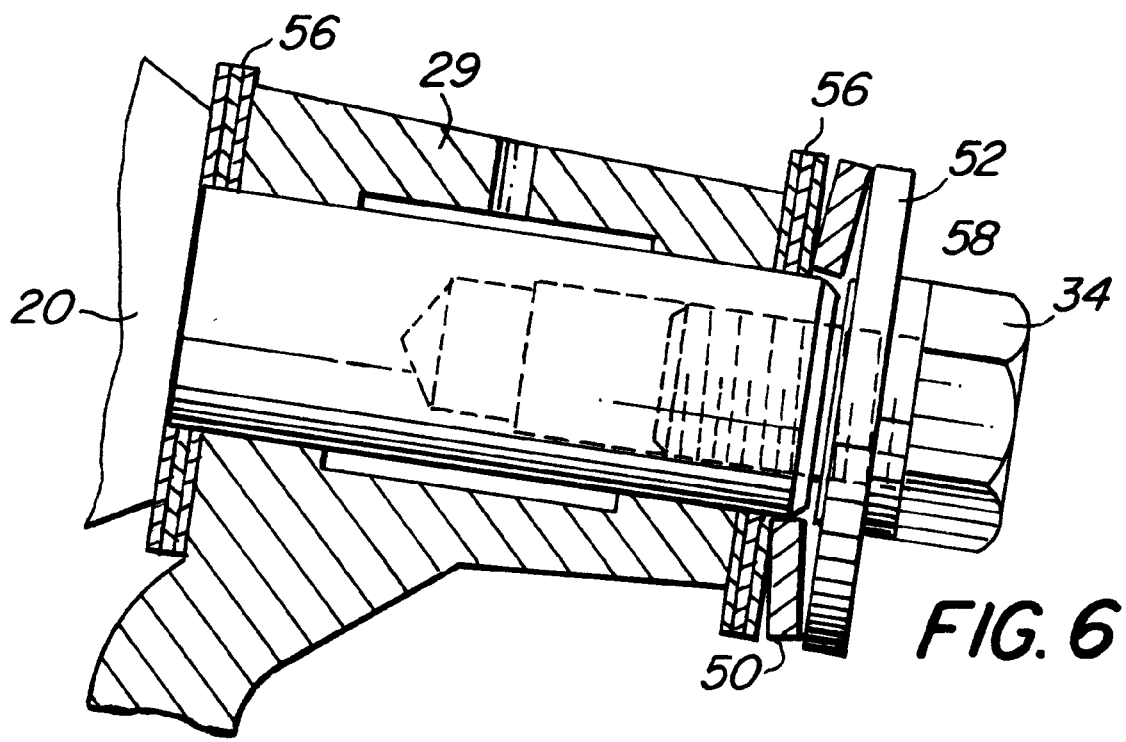
FIG. 6 is a cross-sectional view of the hub assembly of FIG. 5.

The hub assembly of a first embodiment of the present invention is depicted in FIGS. 5 and 6. A key part of the invention is a disc spring 50, also called a Belleville washer, Belleville disc spring, or Belleville spring. The disc spring 50 is a high carbon, conical shaped washer that acts as a compression spring when deformed from its normal conical shape. It is heat treated for wear resistance and strength. The load washer 52 is a heavy, flat washer with an outside diameter slightly larger than the disc spring 50. The load washer is made from medium carbon steel and is heat treated. The adjusting washers 56 are thin, flat washers made from medium carbon steel and are heat treated. The shims 58 have an outside diameter slightly smaller than that of the pivot shaft 21 and a thickness approximately ⅕ that of the adjusting washers 56. The threaded bore of shaft 21 accepts the bolt 34. A variable number of adjusting washers 56 are used between the machined frame surface 19 and the inner end of the gauge wheel arm hub 29, giving gauge wheel arm 28 its correct lateral position in relation to the furrow disk 22. A variable number of adjusting washers 56 is used on the outside of hub 29 to fully compress disc spring 50. The disc spring 50 is the last part to be slipped onto the pivot shaft 21. The load washer 52 is bolted solidly to the end of pivot shaft 21 by use of bolt 34, thereby sandwiching parts of the hub assembly between its inner surface and the machined frame surface 19.

A variable number of shims 58 may be used between the end of pivot shaft 21 and load washer 52 if necessary to reduce the amount of deflection of the disc spring 50 to approximately 75% of its flat load deflection. Thus properly assembled, the disc spring 50 will provide sufficient axial force through the adjusting washers 56 and hub 29 to prevent the previously mentioned offset loads to cause the arm 28 to turn on a longitudinal axis and to shift the gauge wheels 24 away from the furrow disks 22.

Figure 7:
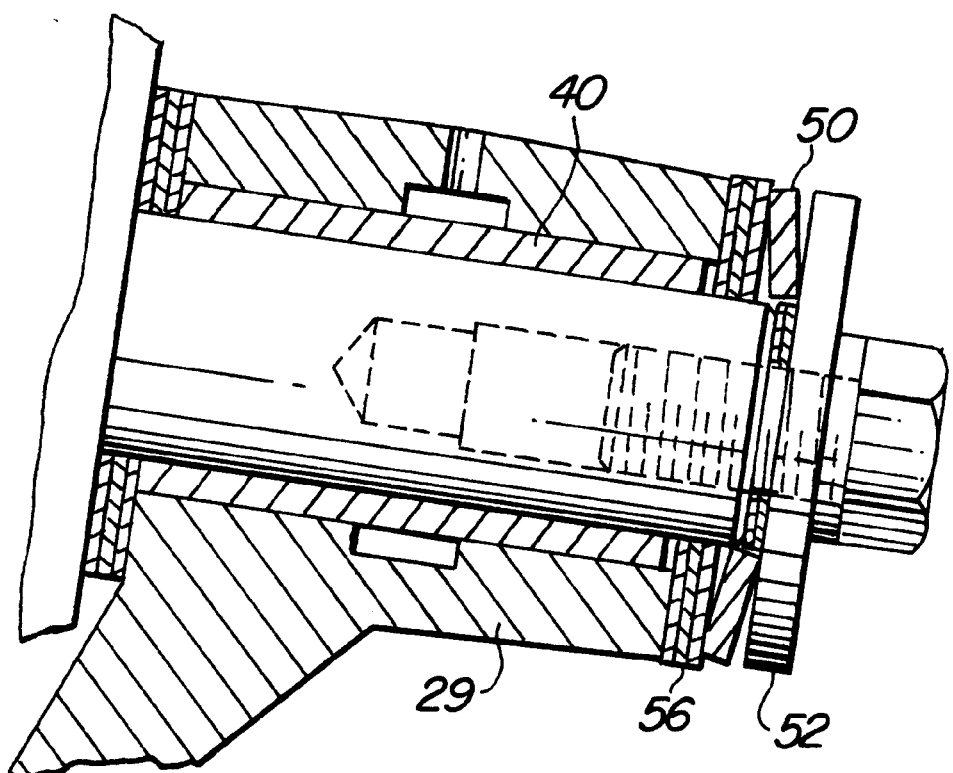
FIG. 7 is a cross-sectional view of the first embodiment which includes a shaft bushing.

FIG. 7 depicts the first embodiment installed in a planter that is equipped with a bushing 40 as previously described in conjunction with FIG. 4. In the present case the bushing 40 is shorter than the hub 29 to allow pressure to be applied to the ends of the hub 29. The disc spring 50 is reoriented 180 degrees such that the convex side is outward. This permits the convex side of the disc spring to be fully loaded by the inside surface of the load washer 52. The diameter of the end of the hub 29 is the same as that of the adjusting washers 56 and disc spring 50. This permits the hub 29 to fully support the load from the concave side of disc spring 50 through the adjusting washers 56.

Figure 8:
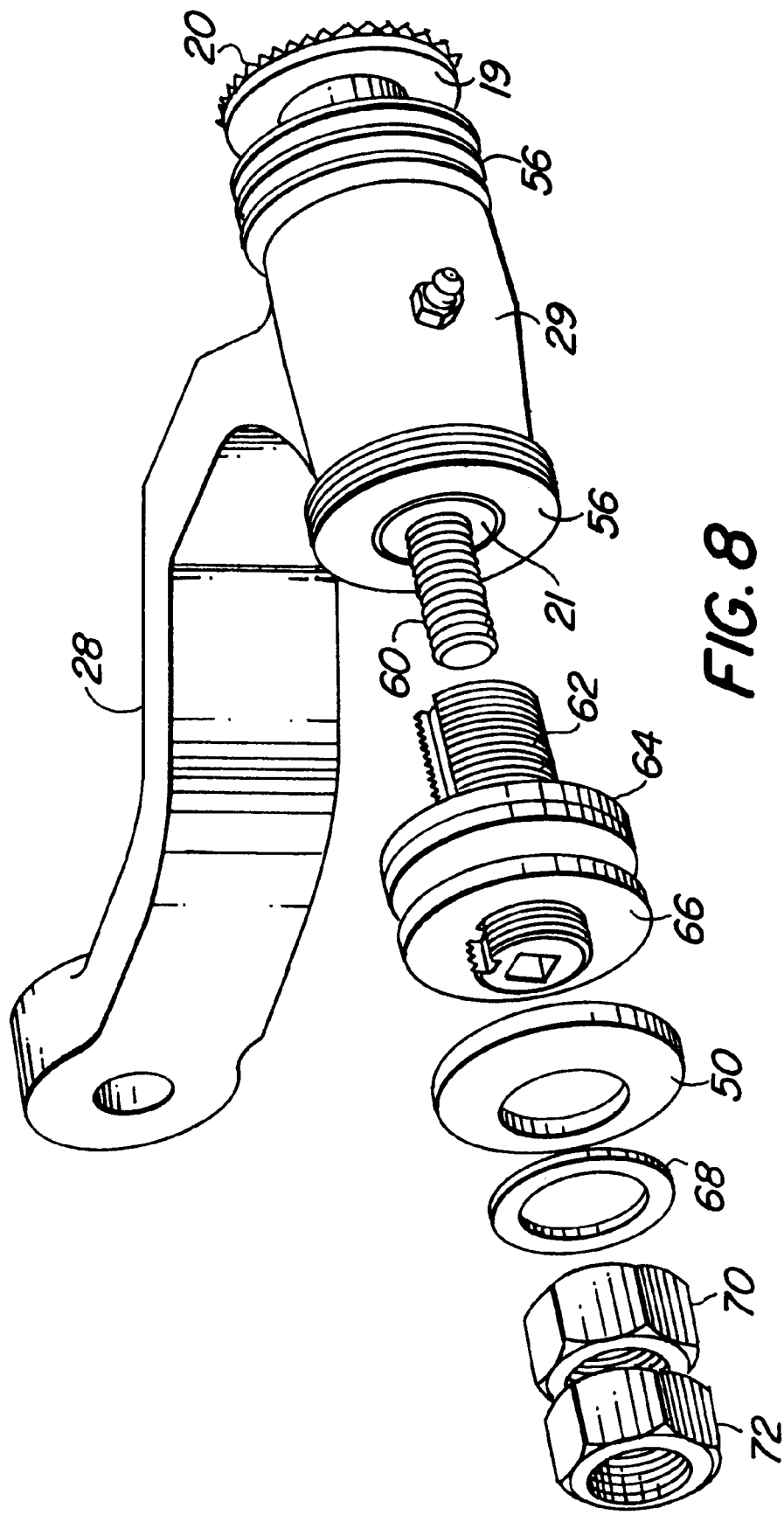
FIG. 8 is an exploded view of a second embodiment of the present invention.
Figure 9:
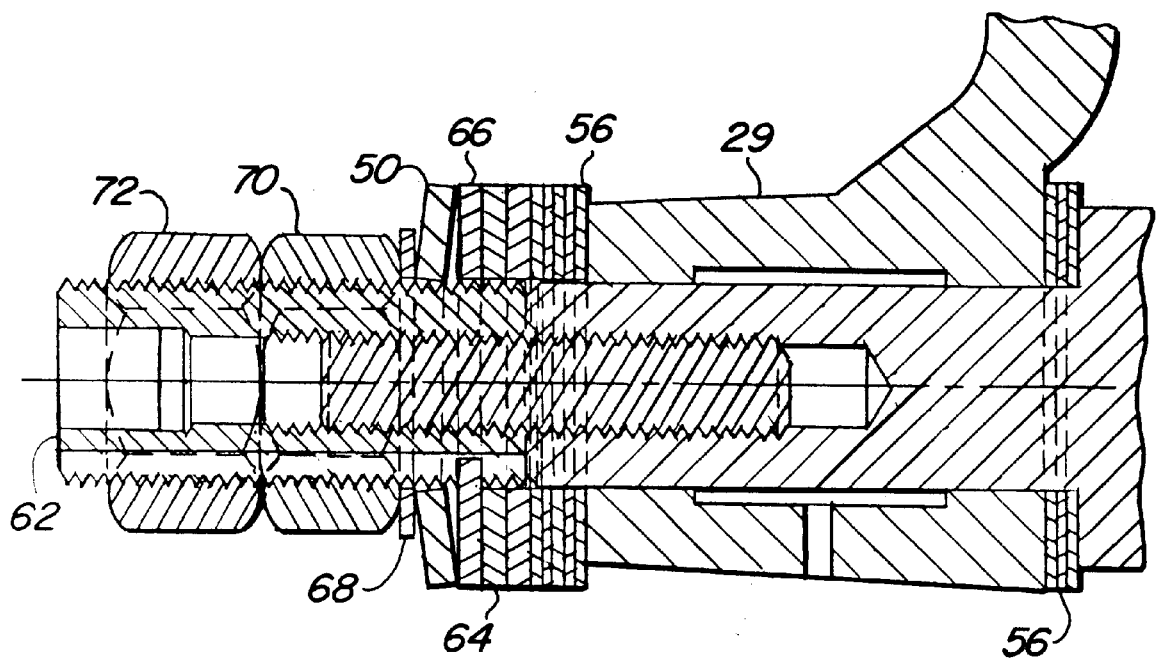
FIG. 9 is a cross-sectional view of the second embodiment.

A second embodiment of the invention is depicted in FIGS. 8 and 9 which further comprises an attaching stud 60, an adjustment stud 62, flat washers 64, a tab washer 66, a seal washer 68, an inner compression nut 70, and an outer locking nut 72. As previously described, the adjusting washers 56 are thin, flat washers made from medium carbon steel and are heat treated, whereas the flat washers 64 and tab washer 66 are of similar material but somewhat thicker.

The attaching stud 60 is installed in the threaded hole in the end of the pivot shaft 21 as deep as the hole will allow. The adjustment stud 62, which has a threaded hole in one end and a square bore in the opposing end to accept the square driver of a standard rachet, is installed onto the stud 60 until it contacts the pivot shaft 21 and is tightened to the proper torque. A variable number of adjusting washers 56 are placed between the machined frame surface 19 and the inner end of the gauge wheel arm hub 29, giving the gauge wheel arm 28 its correct lateral position. Properly positioned, the arm 28 will hold the gauge wheel 24 inner edge against the furrow disks 22 with light pressure. The adjusting washers 56 adjacent the outer end of the hub 29, in conjunction with the flat washers 64 and tab washer 66, transmit force from the disc spring 50 to the hub 29 as previously described. In addition, the tab washer 66 minimizes the rotative motion and resulting wear between the disc spring 50 and adjoining washers by means of its internal tab which engages the keyway in the adjustment stud 62. The seal washer 68 is positioned between the disc spring 50 and inner nut 70 to provide a uniform flat contact surface for these components in order to prevent grease from escaping. The inner nut 70 is used to compress the disc spring 50 the proper amount, while the outer nut 72 is used as a locking device. The adjustment stud 62 and nuts 70, 72 have fine threads to provide for greater adjustability of pressure. After installation, a small amount of steel wool is firmly pressed into the space between the inner nut 70 and the keyway to provide a seal against the escape of grease through the keyway.

Those skilled in the art will recognize that many modifications and variations of the present invention are possible. It is therefore to be understood that, within the scope of the appended claims, the invention may be practiced otherwise than as specifically described.

What is claimed is:

1. An apparatus for reducing wear within gauge wheel arm assemblies of a row planter, said apparatus comprising:

a gauge wheel arm pivot shaft, said pivot shaft having a first end fixed to a frame of a planter and a second end projecting outwardly therefrom, said second end of said pivot shaft having a central threaded bore;

a selected number of first adjusting washers positioned on said pivot shaft outwardly adjacent said first end of said pivot shaft;

a gauge wheel arm having a hub with inner and outer faces and a central bore for rotatably receiving said pivot shaft, said gauge wheel arm hub positioned outwardly adjacent said first adjusting washers on said pivot shaft;

a selected number of second adjusting washers positioned on said pivot shaft outwardly adjacent said gauge wheel arm hub, said selected number of first and second adjusting washers selectively positioning said gauge wheel arm hub laterally onto said pivot shaft;

a disc spring positioned on said pivot shaft outwardly of said second adjusting washers;

a disc spring compression means for compressing said disc spring thereby restraining said hub onto said pivot shaft, such that compression of said disc spring creates a lateral bearing force on said hub, whereby loads on said gauge wheel arm hub which ordinarily cause wear on said hub central bore and said pivot shaft are transferred by bearing forces on said faces of said hub and ultimately to said planter frame rather than through bearing contact of said central bore of said hub with said pivot shaft.

2. The apparatus of claim 1 wherein said disc spring compression means comprises:

a load washer positioned outwardly adjacent said disc spring; and a bolt extendable through said load washer and said disc spring and threadable into said central threaded bore at said second end of said pivot shaft, whereby tightening of said bolt into said central threaded bore compresses said disc spring and creates said lateral bearing force on said hub.

3. The apparatus of claim 2 further comprising a plurality of shims positioned outwardly adjacent said second end of said pivot shaft.

4. The apparatus of claim 1 wherein said disc spring compression means comprises:

a threaded attaching stud threaded into said central threaded bore of said pivot shaft;

an adjusting stud extendable through said disc spring and adapted to threadably receive in one end said threaded attaching stud; and a nut positioned outwardly of said disc spring and threadably receiving said adjusting stud, whereby tightening of said nut onto said adjusting stud compresses said disc spring and creates said lateral bearing force on said hub.

5. The apparatus of claim 4 wherein said adjusting stud includes a keyway and wherein said compression means further comprises:

at least one flat washer positioned outwardly adjacent said second adjusting washers;

a tab washer having an internal tab, said tab washer positioned outwardly adjacent said flat washers, said internal tab receivingly positioned in said keyway of said adjusting stud, both said flat washers and said tab washers being located inwardly of said disc spring on said adjusting stud, whereby said flat washers provide a bearing surface area on said second adjusting washers and said tab washer prevents rotation of said flat washers and second adjusting washers as said nut is being tightened onto said adjusting stud to compress said disc spring.

6. The apparatus of claim 5 wherein said nut is a locking nut.

7. The apparatus of claim 5 wherein said nut includes a compression nut and a locking nut.

8. The apparatus of claim 5 wherein said adjusting stud is adapted at one other end to receive a tool for turning said adjusting stud onto said attaching stud.

9. A method for reducing wear within gauge wheel arm assemblies of a row planter, said method comprising:

exposing a gauge wheel arm pivot shaft on said planter, said pivot shaft having a first end fixed to a frame of said planter and a second end projecting outwardly therefrom, said second end of said pivot shaft having a central threaded bore;

placing a selected number of first adjusting washers onto said pivot shaft outwardly adjacent said first end of said pivot shaft;

placing a gauge wheel arm having a hub with inner and outer faces and a central bore for rotatably receiving said pivot shaft onto said pivot shaft, said gauge wheel arm hub being positioned outwardly adjacent said first adjusting washers on said pivot shaft;

placing a selected number of second adjusting washers onto said pivot shaft outwardly adjacent said gauge wheel arm hub, said selected number of first and second adjusting washers selectively positioning said gauge wheel arm hub laterally onto said pivot shaft;

placing a disc spring positioned on said pivot shaft outwardly of said second adjusting washers;

attaching a disc spring compression means to said pivot shaft in order to restrain said hub onto said pivot shaft, such that compression of said disc spring creates a lateral bearing force on said hub, whereby loads on said gauge wheel arm hub which ordinarily cause wear on said hub central bore and said pivot shaft are transferred by bearing forces on said faces of said hub and ultimately to said planter frame rather than through bearing contact of said central bore of said hub with said pivot shaft.

10. The method of claim 9 wherein said disc spring compression means comprises:

a load washer positioned outwardly adjacent said disc spring; and a bolt extendable through said load washer and said disc spring and threadable into said central threaded bore at said second end of said pivot shaft, whereby tightening of said bolt into said central threaded bore compresses said disc spring and creates said lateral bearing force on said hub.

11. The apparatus of claim 10 further comprising a plurality of shims positioned outwardly adjacent said second end of said pivot shaft.

12. The apparatus of claim 9 wherein said disc spring compression means comprises:

a threaded attaching stud threaded into said central threaded bore of said pivot shaft;

an adjusting stud extendable through said disc spring and adapted to threadably receive in one end said threaded attaching stud; and a nut positioned outwardly of said disc spring and threadably receiving said adjusting stud, whereby tightening of said nut onto said adjusting stud compresses said disc spring and creates said lateral bearing force on said hub.

13. The apparatus of claim 12 wherein said adjusting stud includes a keyway and wherein said disc spring compression means further comprises:
    at least one flat washer positioned outwardly adjacent said second adjusting washers;
    a tab washer having an internal tab, said tab washer positioned outwardly adjacent said flat washers, said internal tab receivingly positioned in said keyway of said adjusting stud, both said flat washers and said tab washers being located inwardly of said disc spring on said adjusting stud, whereby said flat washers provide a bearing surface area on said second adjusting washers and said tab washer prevents rotation of said flat washers and second adjusting washers as said nut is being tightened onto said adjusting stud to compress said disc spring.

14. The apparatus of claim 13 wherein said nut is a locking nut.

15. The apparatus of claim 13 wherein said nut includes a compression nut and a locking nut.

16. The apparatus of claim 13 wherein said adjusting stud is adapted at one other end to receive a tool for turning said adjusting stud onto said attaching stud.

\* \* \* \* \*